INVENTOR.
ROBERT H. DICKE
BY
ATTORNEY

INVENTOR.
ROBERT H. DICKE

Dec. 26, 1950        R. H. DICKE        2,535,274
MOVING TARGET INDICATOR
Filed April 24, 1945        3 Sheets-Sheet 3
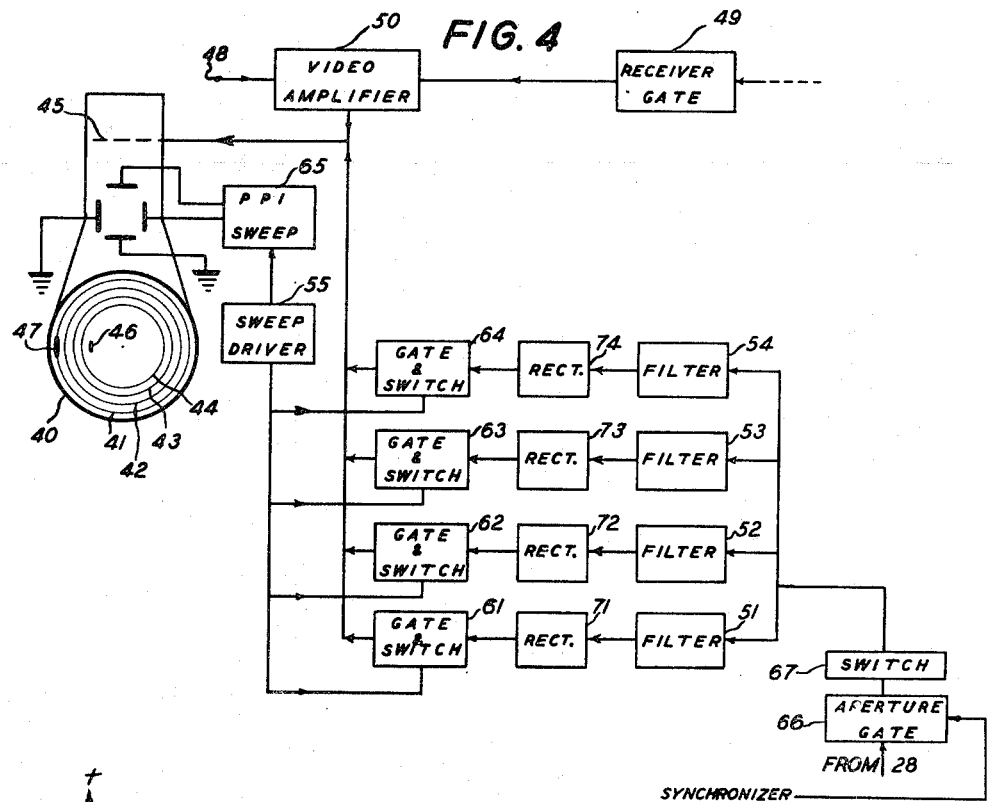
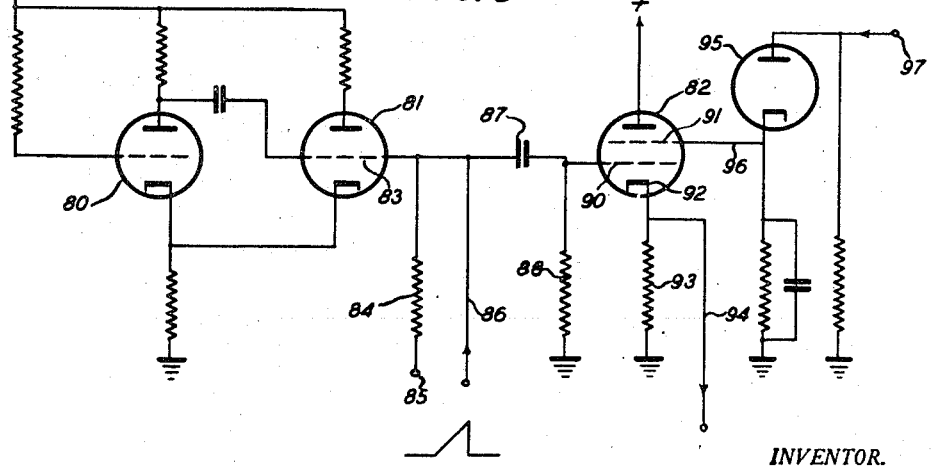
INVENTOR.
ROBERT H. DICKE
BY
William D. Hall
ATTORNEY

Patented Dec. 26, 1950

2,535,274

UNITED STATES PATENT OFFICE

2,535,274

MOVING TARGET INDICATOR

Robert H. Dicke, Cambridge, Mass., assignor, by mesne assignments, to the United States of America as represented by the Secretary of War Application April 24, 1945, Serial No. 590,052

12 Claims. (Cl. 343—9)

The present invention relates to a radio object-locating system and it relates more particularly to a radio object-locating system of a character adapted to readily distinguish fixed objects from moving objects.

In conventional radio object-locating systems it is difficult to readily distinguish fixed objects from moving objects, the result being that echoes from moving objects are often lost in, or obscured by, ground clutter or permanent echoes such as obtained from hills, trees and buildings.

It is therefore an object of the present invention to provide a radio object-locating system that provides not only the usual range and azimuth information, which is an inherent characteristic of nearly all pulse transmission types of radio object-locating systems, but also provides information of a character whereby it is possible to readily distinguish a fixed object from a moving object.

It is also an object of the present invention to provide a radio object-locating system whereby the velocity of the object relative to the system may be determined.

Other objects and advantages of the present invention will become more apparent as the description proceeds, reference being had to the accompanying drawings wherein specific embodiments of the invention are shown. It is to be understood that the drawings and description are illustrative only and are not to be taken as limiting the invention except insofar as it is limited by the appended claims. In the drawings:

Fig. 4 is a block diagram of one embodiment of an indicating circuit that may be employed in the radio object-locating system herein described; and Fig. 5 is a schematic circuit diagram of a portion of the indicating circuit shown in block form in Fig. 3.

A radio object-locating system that distinguishes fixed objects from moving objects includes a transmitter and an associated receiver, the transmitter providing successive short duration, high carrier-frequency exploratory pulses of radiant energy, synchronized in fixed phase relation to reference oscillations provided locally at the receiver. An essential characteristic of these reference oscillations is that they have a fixed phase with respect to the phase of the exploratory pulses. The reference oscillations may consist of locally generated continuous wave oscillations synchronized in phase with the exploratory pulses, or they may comprise any other oscillations having this characteristic. If desired, the reference oscillations, or timing wave as they are sometimes called, may consist of an interrupted continuous wave train initiated by the transmitted pulse and acting in such a manner as to provide oscillations starting in fixed phase with each transmitted pulse, lasting for a period of time, and being damped out just before the start of the next succeeding pulse.

The radiant energy contained in the echo-pulses returning from an object has a certain phase relation with respect to the reference oscillations, the relative phase between the two being dependent upon the instantaneous range of the object. In the case of a moving object (where the range is changing), said relative phase will vary from pulse to pulse.

If the echo-pulses are algebraically combined with the reference oscillations, they will combine in such a manner as to reinforce or oppose one another to a varying degree in a relationship depending upon the relative phase between the two. By detecting the resulting combination, video pulses may be obtained, the amplitude of said video pulses being dependent upon said relative phase. As the object moves, the phase of successive echo-pulses relative to the reference oscillations changes, and the amplitude of the resultant successive video pulses varies in a periodic manner.

Figure 1:
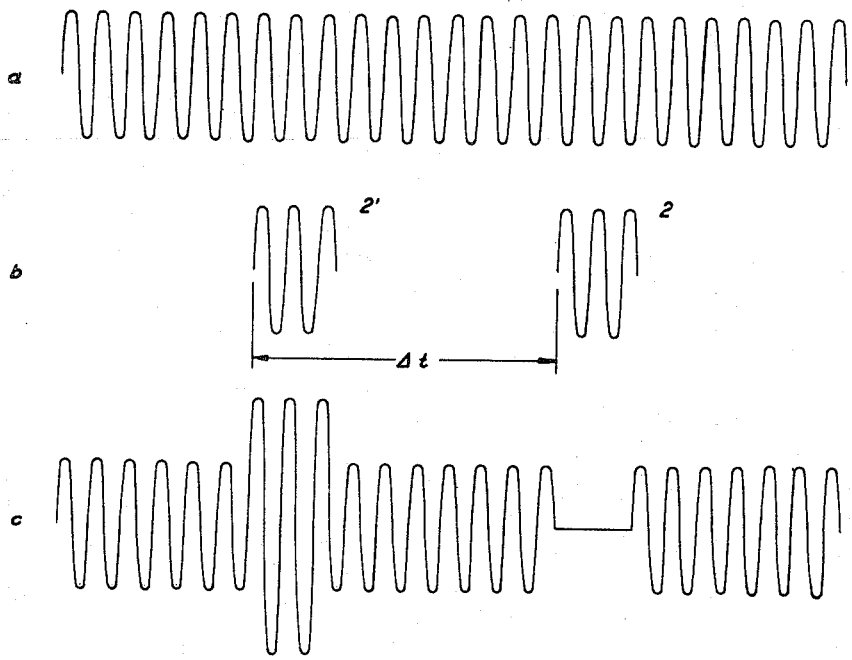
Fig. 1 is a diagrammatic representation of the phase relations of certain waveforms which occur in radio object-locating systems of the character herein described.

The aforementioned phase relations will be more fully understood by reference to Fig. 1 where particular emphasis is directed to the phase relationships, rather than to an accurate pictorial representation of the actual radio frequency waveforms. In Fig. 1 (a) the wave train shown represents the locally generated reference oscillations which are synchronized to the transmitted pulses. In Fig. 1 (b) an echo-pulse of radiant energy reflected by a moving object is represented by wave train 2, and the position of a second echo-pulse reflected by the same object at a time Δt later is represented by wave train 2'. Fig. 1 (c) shows the algebraic combination of the reference oscillations of Fig. 1 (a) and the echo-pulses of Fig. 1 (b). From Fig. 1 (c) it is apparent that wave train 2, when combined with the reference oscillations, totally opposes said reference oscillations, whereas wave train 2', when so combined, totally reinforces said reference oscillations.

It will be apparent that as an object moves, echo-pulses such as represented by short wave trains 2 and 2' will have various other phase relationships with respect to the reference oscillations. As a result, certain echo-pulses will neither totally reinforce nor totally cancel the reference oscillations, and combination oscillations will be present in each case. The amplitude of oscillation is, of course, dependent upon the phase relation between the reference oscillations and the echo-pulse.

By combining a plurality of echo-pulses from a particular moving object with the synchronized reference oscillations, and continuously detecting the resultant combination, a plurality of video pulses may be obtained whose amplitudes vary in a periodic manner. The modulation envelope of such a plurality of video pulses is substantially sinusoidal, and it has a frequency that is a function of the object velocity.

It can be shown that the mathematical expression for the frequency of this modulation envelope is equal to the expression for the difference of frequency between transmitted and received electromagnetic waves wherein said frequency difference occurs only if the distance between the transmitting and receiving sources is changing. This latter phenomenon is known as the "Doppler effect," and this change in frequency provides means for determining the velocity of the object. In the present discussion, the moving object, which is reflecting or re-radiating the exploratory pulses may be considered to be the transmitting source to complete the Doppler effect analogy. Thus the frequency of the modulation envelope of a plurality of video pulses representing a particular object, provides an indication of object velocity.

The phase of energy contained in echo-pulses reflected by fixed objects, relative to the phase of reference oscillations will be substantially constant and hence will always reinforce or oppose said reference oscillations to the same degree.

In view of the foregoing it is evident that moving objects are manifested by video pulses having a periodic variation in amplitude, whereas fixed objects are manifested by video pulses having substantially constant amplitude.

Figure 2:
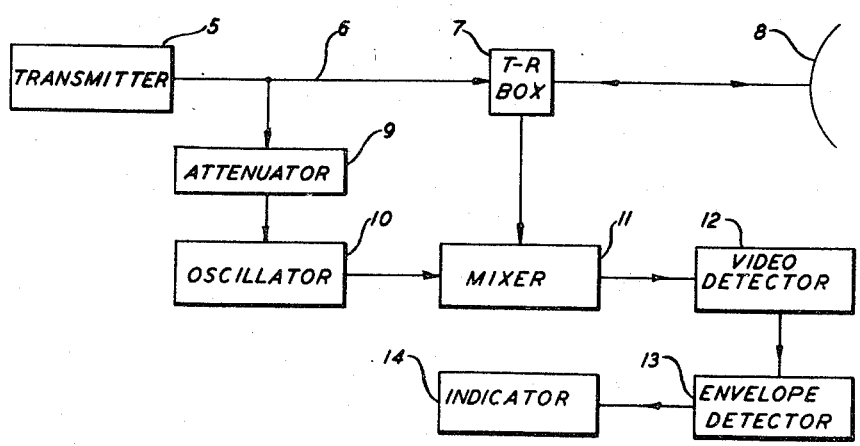
Fig. 2 is a schematic diagram in block form of one embodiment of the present invention.

Referring now to Fig. 2 there is one embodiment of the present invention. Transmitter 5 is adapted to generate short duration, high carrier-frequency exploratory pulses of radiant energy which are fed, by a suitable transmission means 6, through a customary transmit-receive switch 7, to a directional antenna 8.

Transmit-receive switch 7, wh'ch is hereinafter referred to as a T-R box, functions during the transmission of exploratory pulses to connect transmitter 5 to antenna 8 and to disconnect the rest of the circuit shown. During the period between pulses the switch functions to disconnect the transmitter from the antenna, and to connect the antenna to the receiver channel presently to be described.

Simultaneous with pulse transmission, a portion of each of said pulse is applied through attenuator 9 to provide a synchronizing pulse to a local oscillator 10. The output of oscillator 10, which has a frequency substantially the same as the transmitted pulses, thus is locked in synchronism with the transmitted pulses and hence may be applied as reference oscillations to mixer 11.

Echo-pulses received at antenna 8 are fed through T-R box 7 and applied as a second input to mixer 11, the echo-pulses and reference oscillations from oscillator 10 being algebraically combined in said mixer in a manner heretofore described. The resulting oscillatory combination, having a peak amplitude which is a function of the relative phases of the echo-pulses and the reference oscillations, is then applied to video detector 12, the output of which consists of video pulses. The video pulses issuing from said detector are then applied to envelope detector 13, the function of which is to obtain the modulation envelope of a plurality of video pulses.

It is to be understood that the modulation envelope referred to is that obtained from a plurality of video pulses representing one particular moving object. In accordance with the foregoing discussion, the frequency of the modulation envelope will be proportional to the velocity of the object relative to the system.

The velocity indication is then obtained by applying the output of envelope detector 13 to indicator 14 which may be of either the visual or the aural type, one type of which is more fully described hereinafter. Indicator 14 may act merely to distinguish fixed-object echoes from moving-object echoes, or it may be adapted to provide velocity measurement in the case of the latter.

Figure 3:
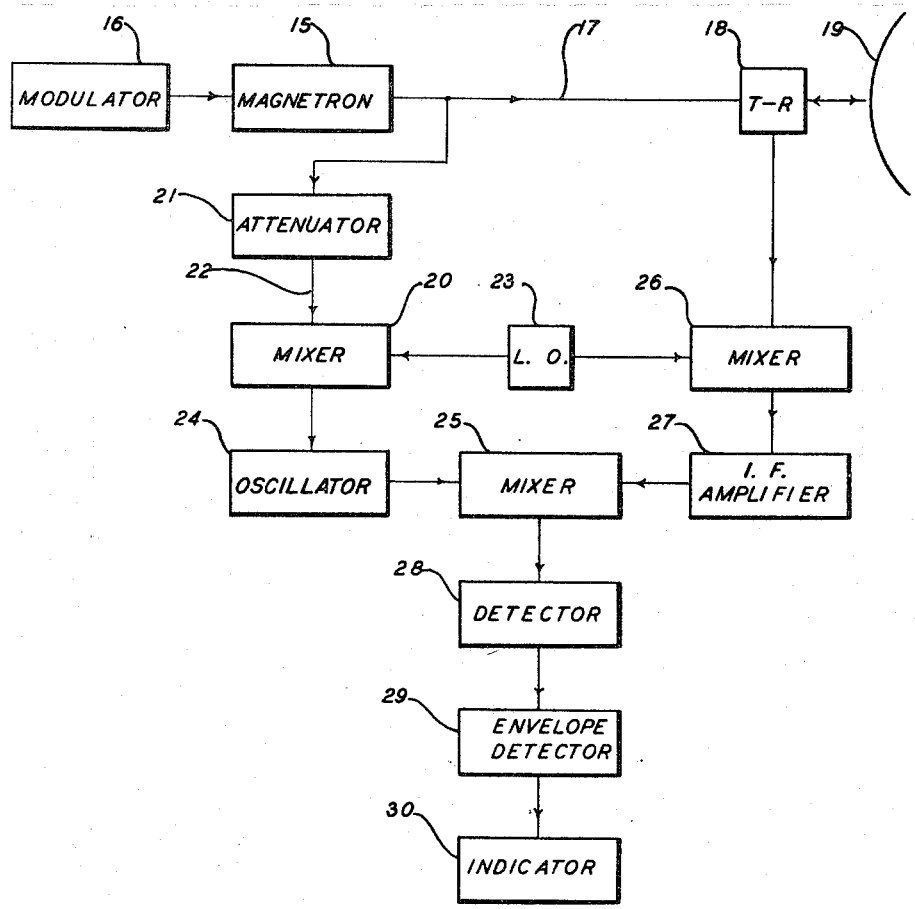
Fig. 3 is a schematic diagram in block form of another embodiment of the present invention.

Referring now to Fig. 3 which is another embodiment of the present invention, the echo-pulses and reference oscillations are reduced to an intermediate frequency prior to mixing. Provision can therefore be made to control the gain of the received signals previous to mixing, thus to eliminate the need for the comparatively high voltage level reference oscillations otherwise necessary for strong echoes. A second advantage is that the synchronization of a reference oscillator may be more easily achieved at an intermediate frequency than at the high radio frequency of the exploratory pulses.

A magnetron 15 or any other suitable element providing radiant energy may be driven by a pulse modulator 16 as indicated. The signal produced by said magnetron consists of radio frequency, exploratory pulses of short duration which are fed from magnetron 15 by suitable transmission means 17 through T-R box 18 to directional antenna 19.

A portion of each transmitted exploratory pulse is also fed to mixer 20 through an attenuator 21 interposed in connection 22 between transmission line 17 and mixer 20. Applied as a second input to mixer 20 are oscillations from local oscillator 23. The beat frequency output of mixer 20 comprises pulses having an intermediate carrier-frequency equal to the difference in frequency between the carrier-frequency of the exploratory pulses and the frequency of local oscillator 23.

The intermediate frequency output from mixer 20 is then applied as a synchronizing pulse to oscillator 24 operating at a frequency substantially equal to the intermediate frequency of the system. Oscillator 24, sometimes referred to as a "coherent oscillator" is an oscillator whose output is locked in synchronism (in coherence) with the exploratory pulses by means of the intermediate frequency synchronizing pulses applied thereto from mixer 20. The output of oscillator 24, which is applied to mixer 25, will therefore have a fixed phase relative to the transmitted pulse and thus may act as reference oscillations for the system.

Echo-pulses received at antenna 19 are passed through T-R box 18 to mixer 26, a second input to mixer 26 consisting of oscillations from local oscillator 23. The beat frequency output of mixer 26 comprises echo-pulses whose carrier-frequency is equal to the difference between the frequency of local oscillator 23 and the carrier-frequency of the received echo-pulses (the intermediate frequency of the system). This beat frequency is substantially equal to the frequency of the coherent reference oscillations applied to mixer 25. The pulse output from mixer 26 may then be applied to intermediate frequency amplifier 27, the output of which is applied as a second input to mixer 25.

In mixer 25 the echo-pulses from amplifier 27 and the reference oscillations from oscillator 24 are algebraically combined. The resulting combination is applied to detector 28 as shown. The output of said detector consists of individual video pulses obtained by detecting the input thereto, there being one video pulse obtained for each echo-pulse input. If the object has motion relative to the system, the video pulses representing this object will have a cyclical variation in amplitude, whereas on the other hand, if the object is stationary with respect to the system, the video pulses will have a substantially constant amplitude.

A plurality of video pulses from detector 28 manifesting a particular moving object may then be applied to envelope detector 29 to obtain a modulation envelope whose frequency provides a measure of object velocity. The voltage representing the modulation envelope may then be applied to indicator 30 which may be of either the visual or aural type. If desired, indicator 30 may be suitably calibrated to give a measure of object velocity. However, if it is desired merely to distinguish fixed objects from moving objects, the output of detector 28 may be applied directly to indicator 30.

Systems of the character described above, wherein reference oscillations are generated locally, are often referred to as coherent-pulse echo systems.

Referring now to Fig. 4 there is shown an indicating circuit having the advantages of excellent signal-to-noise sensitivity, and which is particularly adapted to present the information derived from the above-described portions of the present system. In the indicator circuit shown, the range, azimuth, and velocity information is shown visually by means of a P. P. I. presentation on the screen of a cathode ray tube. The term P. P. I. (plan position indicator) refers to an indicating system in which data relating to range and azimuth is presented in terms of polar-coordinates. The cathode ray tube used for this purpose, for reasons of clarity and brevity, generally is referred to as a P. P. I. tube.

The time base for such a tube is produced by the motion of an electron beam and is evidenced by a radial line or marker which in normal operation appears faintly on the screen of said tube. Upon the application of a sensitizing pulse to the grid of the P. P. I. tube the electron beam is intensified producing thereby a bright spot on said screen. When employed in a radio object-location system the intensifying pulse is obtained from the echo-pulses returning from an object. In the indicating system herein described two bright spots are produced on the screen of P. P. I. tube 40 for each object, one spot (46) providing range and azimuth information, the other (47) providing velocity information. The former appears on the inner radial portion of the screen as a conventional P. P. I. display.

The outer radial portion of said screen is provided with concentric velocity rings or marks 41, 42, 43, and 44, as indicated. Each mark represents a particular object velocity (or range of velocities), and said marks may be engraved on a cathode ray tube screen or, if desired, may be produced electronically or by any other suitable means.

Considering a single object, the electron beam will be intensified twice during each sweep of the beam by application of pulses to grid 45 of cathode ray tube 40. As mentioned, spot 46 provides range and azimuth information, while spot 47 provides velocity information.

The term "gate," as hereinafter used, refers to a voltage waveform having positive and negative portions of substantially rectangular waveform. The circuit producing the gate may be synchronized, or actuated, to function at a particular moment so that one set of conditions are present when the gate is positive going and a different set of conditions are present when the gate is negative going.

In the figure, first consideration will be given to the means whereby range and azimuth information is supplied to grid 45 of cathode ray tube 40. The pulse output from intermediate frequency amplifier 27 of Fig. 3 provides this information. The pulses are applied at terminal 48 to video amplifier 50 of Fig. 4, the output of which is applied to intensifying grid 45 of cathode ray tube 40. A receiver gate circuit 49 associated with video amplifier 50 causes the video signals to be blanked out at all times except during the time corresponding to the region in range which contains the desired object.

The velocity information which is to be presented on cathode ray tube 40 is obtained from detector 12 of Fig. 2 or detector 28 of Fig. 3. This information is supplied as an intensifying voltage to the grid of cathode ray tube 40 by means of circuits hereinafter described. These circuits act independently of those producing the range and azimuth presentation and function to provide velocity indication as exemplified by spot 47 shown on the screen of cathode ray tube 40.

As the frequency of the modulation envelope of a series of video pulses is a direct function of object velocity, frequency-responsive circuits may be employed to derive the desired velocity information. In the embodiment of Fig. 4, a number of filters 51, 52, 53 and 54 are utilized in producing this indication. It is apparent that in order to cover several velocities, it is necessary to have a corresponding number of frequency-responsive filter circuits. Each filter may have a relatively broad band characteristic, thus to respond to a band of frequencies corresponding to a reasonable velocity range. For example, one filter circuit and associated components may respond to modulation envelope frequencies corresponding to a variation in velocity of 200–220 miles per hour. In such a case the velocity mark on the cathode ray tube corresponding to this range may be calibrated to represent a velocity range of 200–220 miles per hour.

The velocity indicating circuit functions in the following manner: a sweep driver 55 (Fig. 4) generates a saw-tooth sweep voltage which is fed simultaneously to gate and switch circuits 61, 62, 63 and 64 and to P. P. I. sweep circuit 65. The output of this latter circuit produces the P. P. I. time base for cathode ray tube 40. The sweep driver 55 may be synchronized to the modulator of the radio frequency transmitter.

The video pulse output from detector 28 of Fig. 3 is fed by means of an aperture gate circuit 66 and switch 67 to filters 51, 52, 53 and 54. Aperture gate circuit 66 is actuated by a suitable synchronizing pulse and generates a narrow gate displaceable in range position which is employed to operate a switch 67. The purpose of switch 67 is to apply the output of detector 28 of Fig. 3 to the plurality of filters at the appropriate time in each pulse cycle, thereby permitting only the signals from a selected moving object to appear at the input to said filters.

For clarity and purposes of description, only the effect of echo-pulses manifesting a particular object selected by aperture gate 66 will be considered in the following discussion. Furthermore, let it be assumed that the modulation envelope of a plurality of video pulses, representing said object and having a frequency that represents the velocity of the object, is such that it will be passed by filter circuit 51 and rejected by the others indicated. The output of filter 51, which comprises an oscillatory voltage, is fed to rectifier 71, the output of said rectifier being a D. C. voltage which is applied as a control voltage to gate and switch 61. The combination of the control voltage from rectifier 71 and the output of sweep driver 55 cooperate at the proper time (more fully described hereinafter) to produce a pulse output from gate and switch circuit 61. This pulse is then applied to intensifying grid 45 of cathode ray tube 40 to produce bright spot 47 falling on the particular velocity ring calibrated to the channel of filter 51.

From the symmetry of the circuit of Fig. 3 it is apparent that the action of the remaining "filter," "rectifier" and "gate and switch" circuits is substantially the same as that of the circuit elements just described. The only difference is that each filter is tuned to a different frequency and its associated gate and switch circuit operates in a manner which causes the electron beam to be intensified at the instant it crosses the velocity mark corresponding to the frequency representing that particular filter channel.

The operation of this circuit will be more fully understood by reference to Fig. 5 which shows one embodiment of a portion of the indicating circuit shown in block form in Fig. 4. Vacuum tubes 80 and 81 and their immediate associated circuit elements, as shown, comprise a gate circuit which, in conjunction with vacuum tube 82, functions as a single gate and switch circuit represented as any of 61, 62, 63 or 64 in Fig. 4.

Control grid 83 of vacuum tube 81 is connected through resistance 84 to a source of bias potential 85. A triangular waveform voltage from sweep driver 55 of Fig. 4 is applied to control grid 83 by means of connection 86. When said triangular voltage exceeds the bias of control grid 83, the gate circuit having vacuum tubes 80 and 81 will operate. The output of said gate circuit is taken from control grid 83; it consists of a voltage having a substantially rectangular waveform. This voltage is then fed through a differentiating circuit comprising capacitance 87 and resistance 88.

The output of the differentiating circuit, consisting of a sharp pulse of short duration developed across resistance 88, is applied to control grid 90 of coincidence tube 82. Vacuum tube 82, normally biased beyond cut-off, will conduct only when screen grid 91 of said tube is raised to a sufficient positive potential and a signal, in this embodiment a pulse, is applied to control grid 90. Cathode 92 may be connected through resistance 93 to ground, a positive going pulse being developed across said resistance. This pulse is then applied by means of connection 94 to intensifying grid 45 of P. P. I. tube 40 (Fig. 1).

Vacuum tube 95 functions as a rectifier and is equivalent to one of the rectifiers 71, 72, 73 and 74 of Fig. 4. Said vacuum tube will have a voltage input at terminal 97 only if a plurality of video pulses, evidencing a moving object, has a modulation envelope which passes the filter preceding said rectifier. As the direct current output of rectifier 95 supplies the positive potential to screen grid 91 of vacuum tube 82, it can be seen that vacuum tube 82 conducts only for a particular frequency where said frequency is that passed by the filter associated with rectifier 95. Furthermore, vacuum tube 82 will conduct only for a period of time corresponding to the duration of the pulses applied to control grid 90 thereof.

As the instant of conduction of vacuum tube 82 is controlled by the triangular voltage waveform and the bias applied to control grid 83 of vacuum tube 81 (where said triangular waveform also controls the time base of the P. P. I. tube) it is evident that the pulse from connection 94 can be made to produce a spot such as 47 (Fig. 4) at any predetermined portion of the time base.

To accomplish this for various velocities, the bias potential 85 applied to control grid 83 of vacuum tube 81 will be different for each gate circuit and each gate circuit will be actuated by a different part of the triangular voltage waveform. As this triangular wave also controls the time base of the P. P. I. indicating tube, the initiating pulse fed to control grid 90 of vacuum tube 82 and hence the output pulse from said tube can be made to occur when the electron beam of the P. P. I. tube is "sweeping over" a velocity mark produced on the screen of the P. P. I. tube corresponding to the frequency for which this specific channel is calibrated.

Having thus described the invention what is claimed as new and desired to be secured by Letters Patent is:

1. In a coherent pulse echo radio object-location system, of the character described, wherein a series of short duration, high carrier-frequency pulses of radiant energy are transmitted, and echo-pulses returned from a particular object are combined with reference oscillations synchronized with said transmitted pulses to produce a series of video echo-pulses having a modulation envelope, the frequency of said modulation envelope depending on the object velocity, a plurality of filters, means for applying said modulation envelope simultaneously to said filters, thereby producing from one of said filters a cyclical voltage having the same frequency as the modulation envelope of said video pulses, means for rectifying said cyclical voltage, a gate circuit, and means for applying said rectified voltage to said gate circuit, a plan position indicator cathode ray tube, means for generating an electron beam in said tube, and deflection means for said beam, said tube having an indicating screen having a peripheral zone for velocity indication and a central range and azimuth indicating zone thereon, concentric velocity marks on said velocity indication zone portion of said cathode ray tube screen, means for calibrating said marks with said filters, means for generating a sweep voltage, means for applying said sweep voltage to said beam deflection means of said cathode ray tube and to said gate circuit, said sweep voltage controlling said gate circuit to provide a pulse output therefrom, means for intensifying said electron beam, means for applying said pulse output to said cathode ray tube to thereby intensify said beam, whereby the indication produced appears on a portion of the velocity mark corresponding to the filter producing said modulation envelope voltage.

2. In a coherent pulse echo radio object-location system of the character described, wherein a series of short duration, high carrier-frequency pulses of radiant energy are transmitted and object-returned echo-pulses are combined with reference oscillations synchronized to said transmitted pulses to produce a series of video echo-pulses having a modulation envelope, the frequency of said modulation envelope being determined by object velocity, means for selecting video echo-pulses from a particular object, a plurality of filters, means for applying selected video echo-pulses simultaneously to said filters to produce from one of said filters a cyclical voltage having the same frequency as the modulation envelope of said video pulses, means for rectifying said cyclical voltage, a gate circuit, and means for applying said rectified voltage to said gate circuit, a cathode ray tube having beam deflection means, sweep voltage generating means and means for applying said sweep voltage to said beam deflection means and to said gate circuit, said sweep voltage actuating said gate circuit to provide a pulse, means for applying said pulse to said cathode ray tube thereby producing a visual indication, velocity indicating means connected to the last mentioned means to provide measurement of object velocity.

3. In a coherent pulse echo radio object-location system, of the character described, means for transmitting a series of short duration, high carrier-frequency pulses of radiant energy, means for receiving object-returned echo-pulses, means for generating reference oscillations synchronized to said transmitted pulses, means for combining said echo-pulses with said reference oscillations to produce a series of video echo-pulses having a modulation envelope, the frequency of said envelope being determined by object velocity, a plan position indicating cathode ray tube system including means for generating an electron beam and deflection means therefor and an indicating screen having a peripheral zone for velocity indication and a central range and azimuth indicating zone thereon, concentric velocity marks on said velocity indication zone portion of said cathode ray tube screen, means for intensifying said electron beam of said cathode ray tube and producing thereby a visual indication in the zone of said velocity marks to provide measurement of object velocity.

4. In a coherent pulse echo radio object-location system, of the character described, means for transmitting a series of short duration, high carrier-frequency pulses of radiant energy, means for receiving object-returned echo-pulses, means for generating reference oscillations synchronized with said transmitted pulses, means for combining said echo-pulses and said reference oscillations to produce a series of video echo-pulses having a modulation envelope, the frequency of said modulation envelope being determined by the velocity of the object, a cathode ray tube having a screen comprising a range and azimuth zone and a velocity indication zone, means for indicating range and azimuth of moving and fixed objects on said range and azimuth zone, and means for indicating velocity of a moving object on said velocity indication zone.

5. The method of velocity indication on a cathode ray tube in a coherent pulse echo radio object-location system wherein short duration, high carrier-frequency pulses of radiant energy are intermittently transmitted and received echo-pulses returning from an object are mixed with reference oscillations synchronized to the transmitted pulses to produce video echo-pulses, the steps including detecting the modulation envelope voltage of a plurality of video echo-pulses thereof, rectifying said voltage, generating a sweep voltage, producing a pulse in response to the rectified modulation envelope voltage and said sweep voltage when the sweep voltage attains a value corresponding to the frequency of the modulation envelope voltage, producing velocity indicating marks corresponding to different values of the sweep voltage, and causing said last mentioned pulse to produce an indication coinciding with a portion of said velocity indicating marks corresponding to the frequency of the aforementioned modulation envelope.

6. A radio object-locating system including means for intermittent transmission of short duration, high carrier-frequency pulses of radiant energy, means for generating continuous wave oscillations, means for beating said oscillations with a portion of said radiant energy pulses to obtain pulses having an intermediate carrier-frequency, means for generating reference oscillations whose frequency is substantially the same as said intermediate frequency and means for locking said reference oscillations with said last-mentioned pulses, means for receiving echo-pulses, means for beating said echo-pulses with said continuous wave oscillations to obtain echo-pulses having an intermediate carrier-frequency, means for combining said pulses and said reference oscillations, means for detecting the combination of said pulses and said reference oscillations to obtain video pulses, means for detecting the modulation envelope of a plurality of said video pulses whereby the frequency of said modulation envelope indicates the velocity of the object.

7. A radio object-locating system including means for intermittent transmission of short duration, high carrier-frequency pulses of radiant energy, means for generating intermediate frequency reference oscillations, means for synchronizing said reference oscillations with said transmitted pulses, means for receiving echo-pulses returning from an object, means for reducing the carrier-frequency of said received echo-pulses to an intermediate carrier-frequency, said frequency being substantially equal to the frequency of said reference oscillations, means for combining said echo-pulses with said reference oscillations, means for detecting the combination of said pulses and said reference oscillations, thereby obtaining video pulses, the rate of change of amplitude of said video pulses providing an indication of object velocity.

8. In a pulse echo method of object-location the steps including the intermittent transmission of short duration, high carrier-frequency exploratory pulses of radiant energy, generating continuous wave oscillations, beating said oscillations with a portion of said radiant energy pulses to obtain pulses having an intermediate carrier-frequency, generating reference oscillations whose frequency is substantially the same as said intermediate frequency, synchronizing said reference oscillations with said last-mentioned pulses, receiving echo-pulses, beating said echo-pulses with said continuous wave oscillations to obtain echo-pulses having an intermediate carrier-frequency, combining said echo-pulses and said reference oscillations, detecting the combination of said pulses and said reference oscillations to produce video pulses, detecting the modulation envelope of a plurality of said video pulses, observing the frequency of said modulation envelope whereby the observed frequency indicates the velocity of the object.

9. In a pulse echo method of object-location the steps including intermittent transmission of short duration high carrier-frequency pulses of radiant energy, generating intermediate frequency reference oscillations synchronized to said transmitted pulses, receiving echo-pulses returning from an object, reducing the carrier-frequency of said received pulses to an intermediate frequency substantially equal to the frequency of said reference oscillations, combining said pulses with said reference oscillations, detecting the combination of said pulses and said reference oscillations to produce video pulses, detecting the modulation envelope of a plurality of said video pulses, observing the frequency of said modulation envelope whereby the observed frequency indicates the velocity of the object.

10. In a radio object-locating system of the character described, means for generating and transmitting short duration, high carrier-frequency exploratory pulses of radiant energy, an oscillator providing reference oscillations, means for synchronizing said oscillator with said exploratory pulses, a mixer and means for applying said reference oscillations as one input thereto, means for receiving object-returned echo-pulses, means for applying said echo-pulses as a second input to said mixer, the output of said mixer being an algebraic combination of said two inputs, a detector and means for applying the output of said mixer to said detector, the output of said detector including video pulses, and means for obtaining a modulation envelope of a plurality of said video pulses to provide an indication of object velocity.

11. In a radio object-locating system of the character described, means for generating and transmitting short duration, high carrier-frequency exploratory pulses of radiant energy, means for generating reference oscillations having a fixed phase relation with said transmitted exploratory pulses, means for receiving object-returned echo-pulses, means for algebraically combining said echo-pulses and said reference oscillations to obtain an oscillatory voltage, means for detecting said oscillatory voltage to obtain video pulses, the rate of change of amplitude of said video pulses providing an indication of object velocity.

12. In a pulse echo method of object-location the steps including, transmission of short duration, high carrier-frequency exploratory pulses of radiant energy, generating reference oscillations synchronized to said exploratory pulses, receiving echo-pulses returned from an object, algebraically combining said echo-pulses and said reference oscillations to obtain an oscillatory voltage, detecting said oscillatory voltage to obtain video pulses, observing the rate of variation in amplitude of video pulses to obtain an indication of object velocity.

ROBERT H. DICKE.

REFERENCES CITED

The following references are of record in the file of this patent:

UNITED STATES PATENTS

| Number | Name | Date |
| --- | --- | --- |
| 1,750,668 | Green | Mar. 18, 1930 |
| 1,945,952 | Nicolson | Feb. 6, 1934 |
| 2,193,361 | Rice | Mar. 12, 1940 |
| 2,401,432 | Luck | June 4, 1946 |
| 2,448,016 | Busignies | Aug. 31, 1948 |
| 2,450,945 | Eaton | Oct. 12, 1948 |
| 2,479,568 | Hansen | Aug. 23, 1949 |
| 2,492,012 | Smith | Dec. 20, 1949 |